US005773823A

United States Patent [19]

Ito et al.

[11] Patent Number: 5,773,823

[45] Date of Patent: Jun. 30, 1998

[54] PLASMA ION SOURCE MASS SPECTROMETER

[75] Inventors: Tetsumasa Ito; Yoshitomo Nakagawa, both of Chiba, Japan

[73] Assignee: Seiko Instruments Inc., Japan

[21] Appl. No.: 585,953

[22] Filed: Jan. 16, 1996

Related U.S. Application Data

[63] Continuation-in-part of Ser. No. 302,503, Sep. 8, 1994, Pat. No. 5,559,337.

[30] Foreign Application Priority Data

Sep. 10, 1993 [JP] Japan .................................... 5-226098
Sep. 29, 1995 [JP] Japan .................................... 7-254136

[51] Int. Cl.[6] ............................ B01D 59/44; H01J 49/00

[52] U.S. Cl. ....................................... 250/288; 250/423 R

[58] Field of Search .................................... 250/281, 288, 250/296, 423 R

[56] References Cited

U.S. PATENT DOCUMENTS

| | | | |
|---|---|---|---|
| 4,963,735 | 10/1990 | Okamoto et al. | 250/281 |
| 4,999,492 | 3/1991 | Nakagawa | 250/288 |
| 5,049,739 | 9/1991 | Okamoto | 250/281 |
| 5,153,433 | 10/1992 | Andersen et al. | 250/296 |
| 5,352,893 | 10/1994 | Freedman | 250/296 |
| 5,357,107 | 10/1994 | Ibach et al. | 250/305 |
| 5,426,301 | 6/1995 | Turner | 250/281 |
| 5,559,337 | 9/1996 | Ito et al. | 250/288 |

*Primary Examiner*—Bruce Anderson
*Attorney, Agent, or Firm*—Adams & Wilks

[57] ABSTRACT

Simplified measurements may be conducted using a plasma ion source mass spectrometer by performing an ion count while scanning an ion beam and setting voltages applied to electrodes of at least an ion lens and a deflector at values which maximize the count value. The mass spectrometer comprises a plasma ion source for ionizing a sample in a plasma, a vacuum vessel containing deflection, detection and monitoring devices, a sampling interface for introducing the ionized sample into the vacuum vessel, and a data processing unit. An ion lens collects and condenses the ionized sample. A mass filter separates ions in the ion beam by mass. A deflector deflects the ion beam by 90 degrees to prevent light from the plasma from entering the mass filter. A scanning electrode scans the ion beam, and a detector detects ions that have passed through the mass filter and provides a corresponding output signal. A power supplies a scanning signal to the scanning electrode, and applies predetermined voltage signals to the ion lens and the deflector. The data processing unit counts output signals from the detector in synchronism with the scanning signal applied to the scanning electrode. Based upon the voltage applied to the scanning electrode and the output signal of the detector, the data processing unit calculates optimum values of voltages to be applied to the deflector, the scanning electrode and the ion lens.

35 Claims, 4 Drawing Sheets

PLASMA ION SOURCE MASS SPECTROMETER

This is a Continuation-In-Part of Ser. No. 08/302,503, filed Sep. 8, 1994, now U.S. Pat. No. 5,559,337.

BACKGROUND OF THE INVENTION

The present invention relates to a plasma ion source mass spectrometer for identifying/determining a very small impurity within a sample. A plasma ion source mass spectrometer involves an inductively coupled plasma mass spectrometer (referred to as an "ICP-MS") and a microwave induction plasma mass spectrometer (referred to as an "MIP-MS").

An example of the conventional structure will now be explained with reference to FIG. 2. In FIG. 2, reference numeral 1 is a plasma generating apparatus, and reference numeral 2 denotes a plasma. Examples of the plasma generating apparatus 1 are an inductively coupled plasma generating apparatus as disclosed in, for instance, "BASIC STUDY AND APPLICATION ON ICP EMISSION ANALYSIS" (KODANSHA SCIENTIFIC, written by HARAGUCHI), and a microwave induction plasma generating apparatus as disclosed in, for example, Japanese Laid-open Patent Application No. 1-309300 (U.S. Pat. No. 4,933,650).

A sample (not shown) to be analyzed is introduced into plasma 2 generated by either the induction coupling type, or the microwave type plasma generating apparatus 1 so as to be ionized. Reference numeral 3 denotes a sampling cone; 4, a skimmer cone; and 5*a*, a vacuum pump. The sampling cone 3 has a conical shape and a hole having a diameter from 0.8 to 1.2 mm is formed at a conical tip portion thereof. The skimmer cone 4 has a conical shape and a hole having a diameter from 0.3 to 0.6 mm is formed at a conical tip portion thereof. The sampling interface is constructed of the sampling cone 3 and the skimmer cone 4. A space between the sampling cone 3 and the skimmer cone 4 is evacuated to a pressure on the order of 1 Torr by the vacuum pump 5*a* (in general, a rotary pump is used) during the analysis operation. Then, ions produced by the plasma 2 pass through the hole of the skimmer cone 4 and the hole of the sampling cone 3.

Reference numeral 6 denotes a vacuum vessel subdivided into two chambers; 7, an ion lens for focusing (converging) the ions passed through the hole of the sampling cone 4; and 8, a mass filter for causing only a specific (mass) ion selected from various types of ions to pass therethrough. Reference numeral 9 denotes a detector for detecting the ion passed through the mass filter 8; 12, a data processing unit for storing and calculating the ion detection data detected by the detector 9. The inside of the vacuum vessel 6 is evacuated by the two vacuum pumps 5*b* and 5*c*, and the pressure in the chamber where the ion lens 7 is installed is maintained on the order of $10^{-4}$ Torr or lens, and the pressure in the chamber where the detector 9 is installed is maintained at less than $10^{-6}$ Torr. It should be noted that either a turbo molecular pump or an oil diffusion pump are generally used for these vacuum pumps 5*a* and 5*c*.

Accordingly, the sample ionized by the plasma 2 passes through the holes of the sampling cone 3 and the skimmer cone 4 together with the light of the plasma 2, and then reaches the ion lens 7. The ion lens 7 introduces only the ions among those reaching it and light into the mass filter 8. The mass filter 8 passes therethrough a preselected mass of ions among the ions reaching the mass filter 8. An example of the mass filter 8 is, for instance, a quadrapole or quarternary mass spectrometer.

The detector 9 detects the ions that passed have through the mass filter 8, and supplies the detected ions as an electric signal to the data processing unit 12. Example of the detector 9 is, for example, "Channeltron" manufactured by Galileo company. In the data processing unit 12, a calculation is made of the mass of the ions from the set values of the mass filter 8 when the ions are detected, so that the type of the ions is identified. Then, the data processing unit 12 calculates the ions identified from the detection intensity of the detector 9, namely the impurity density in the sample.

Next, the ion lens 7 will now be explained with reference to FIG. 3. FIG. 3 is a schematic sectional view for showing the ion lens 7 and the peripheral portion thereof. Reference numeral 13 denotes a sampling interface axis; 7*a*, 7*b*, 7*c* are electrodes constituting the ion lens 7; 15*a* and 15*b*, deflectors; 16, an aperture; and 17, a mass filter axis.

The sampling interface axis 13 is extrapolated from the hole of the sampling cone 3 and the hole of the skimmer cone 4. The beam of the ions that have passed through the hole of the skimmer cone 4 reaches the ion lens along the sampling interface axis 13. The ion lens 7 for converging the ions is constructed of the three electrodes 7*a*, 7*b*, 7*c*. Each of these electrodes has a plate-like form with a hole where the sampling interface axis 13 is located as a center thereof. When the proper voltages are applied to the respective electrodes 7*a*, 7*b*, 7*c*, the beam of the ions is converged. Such an ion lens 7 is referred to as an "Einzellens".

The mass filter axis 17 corresponds to a optical axis on which the focused ion beam reaches to the mass filter 8. The mass filter axis 17 is positioned in parallel to the sampling interface axis 13 with an interval of approximately 10 mm. The aperture 16 has a plate-like shape having a hole in which the mass filter axis 17 is located at a center thereof, and has a function of supplying the beam of ions with the proper energy to the mass filter 8 by applying thereto the proper voltage. The structure of the aperture 16 is not always limited a single aperture, but may comprise several apertures. The parallel plate type deflectors 15*a* and 15*b* are constituted by, for instance, a pair of parallel plate type deflectors. The parallel plate type deflectors 15*a* and 15*b* cause the beam of the ions passed along the sampling interface axis 13 to pass along the mass filter axis 17. In other words, the parallel plate type deflectors 15*a* and 15*b* are employed so as to shift the beam axis of the converged ion in the parallel direction.

As previously described, both of the ion lens 7 and the parallel plate type deflectors 15*a* and 15*b*, which have been constructed in this manner, have one function to introduce the beam of the ions to be detected into the mass filter 8 and the detector 9, and also another function by which the light of the plasma 2 causing the adverse influences to the detector 9 as the background noise may advance in the straight form into the parallel plate type deflectors 15*a* and 15*b*, and may collide at the aperture 16, so that this light does not reach the mass filter 8 and the succeeding components.

The voltages to be applied to the ion lens 7 and the parallel plate type deflectors 15*a* and 15*b* are adjusted such that the signal to be detected by the detector 9 becomes maximum. A large number of electrodes are present in the ion lens 7 and the deflectors 15*a* and 15*b*. In the prior art, since there is no reference values other than the signal intensity of the detector 9, skilled engineers are required to adjust the voltages applied to them. Moreover, there is no confirmation that these voltages can be optimized. If the ion lens 7 and the parallel plate type deflectors 15*a* and 15*b* are not optimized, not only can a sufficient sensitivity of the apparatus not be achieved, but also the apparatus may be operated under unstable condition.

SUMMARY OF THE INVENTION

The present invention has been made to solve the prior art problem, and is a plasma ion source mass spectrometer by comprising a plasma ion source for ionizing a sample in a, a vacuum vessel, plasma a sampling interface for introducing a produced ion into the vacuum vessel, an ion lens arranged in said vacuum vessel for converging said ion, a deflector arranged in said vacuum vessel for deflecting said ion, a mass filter arranged in said vacuum vessel for mass-separating said ion, a scanning electrode arranged in said vacuum vessel for scanning said ion, a detector arranged in said vacuum vessel for detecting an ion passed through said mass filter, an electrode power supply for applying a voltage to said ion lens, said deflector, and said scanning electrode, and a data processing unit for counting a signal from said detector in synchronism with the voltage to be applied by said electrode power supply to said scanning electrode in order to scan said ion. Furthermore, the plasma ion source mass spectrometer, is characterized in that based on the voltage to be applied to said scanning electrode and the signal from said detector, said data processing unit calculates optimum values of voltages to be applied to said deflector and said scanning electrode, and sends a signal for instructing a voltage value to be applied to said ion lens power supply.

According to the plasma ion source mass spectrometer of the present invention, information about the position and the shape, when the ion beam is incident upon the mass filter, can be obtained. Based on this information, the voltages to be applied to the respective electrodes of the ion lens can be determined in such a manner that while the incident position and the shape of the ion beam are brought into the optimum conditions, the resulting ion beam is incident upon the mass filter.

As a result, the ions can be detected at a high efficiency under stable conditions without requiring special skill to adjust the apparatus, so that a reliable analysis can easily be achieved.

DETAILED DESCRIPTION OF THE PREFERRED EMBODIMENTS

Figure 1:
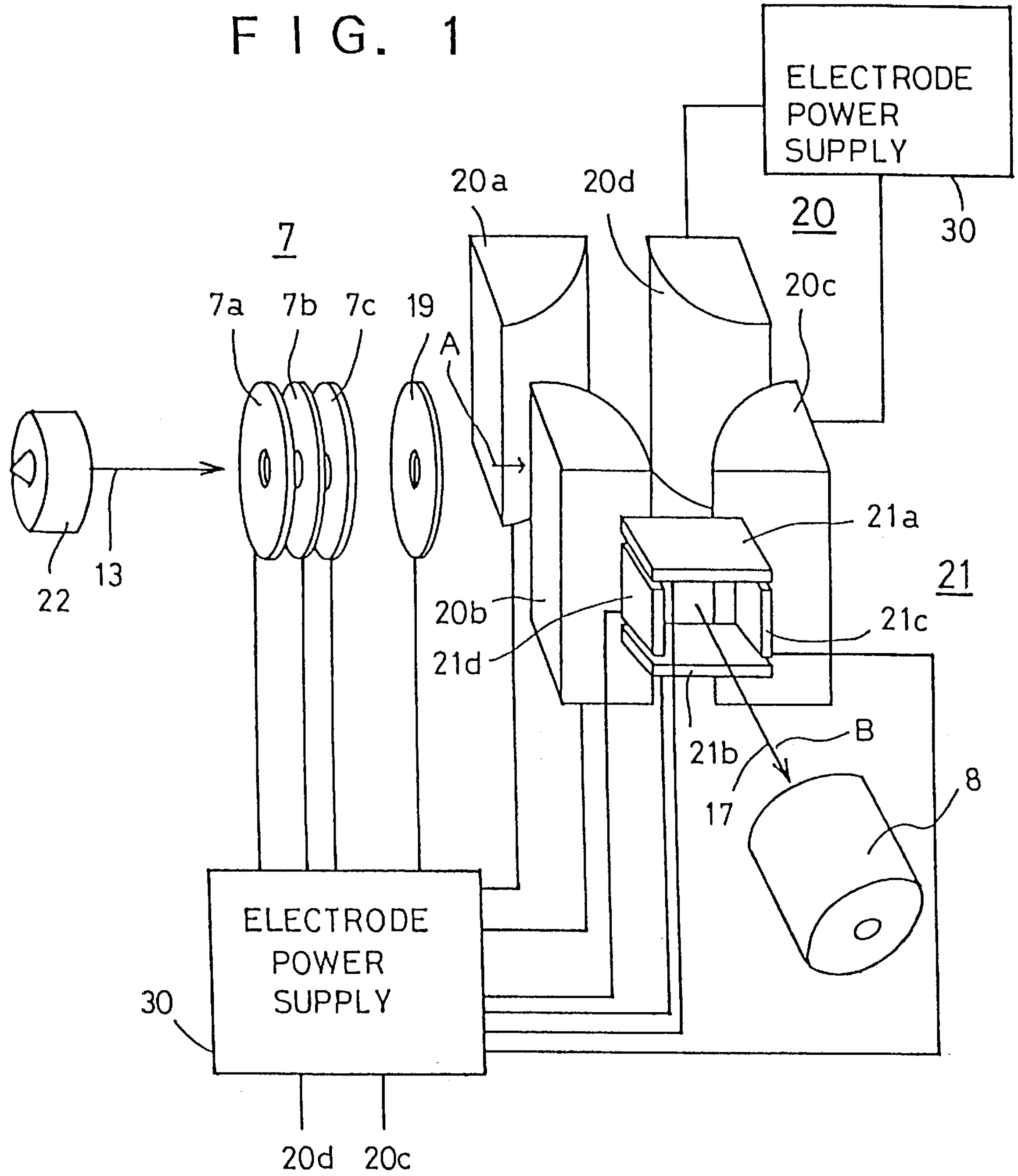
FIG. 1 is a structural diagram illustrating an ion lens and a peripheral portion thereof, according to the present invention.
Figure 2:
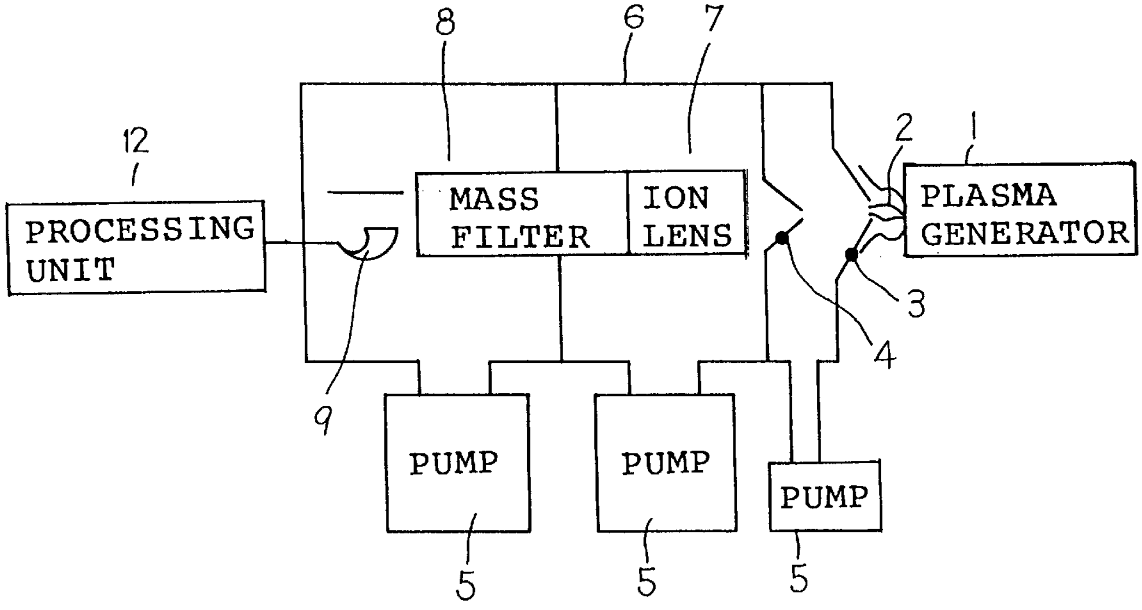
FIG. 2 is a diagram representing a structural example of a plasma ion source mass spectrometer.
Figure 3:
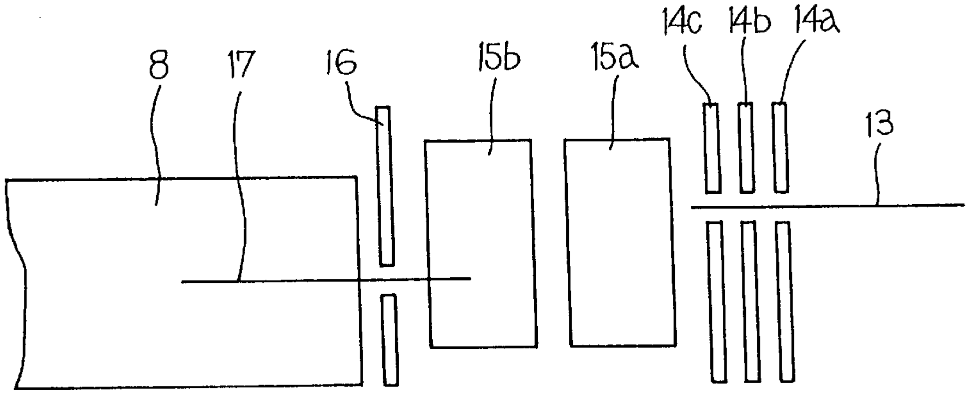
FIG. 3 is a schematic structural diagram showing the conventional ion lens.

Referring now to the drawings, preferred embodiments of the present invention will be described in detail.

FIG. 1 is a perspective view showing an ion lens 7 of the present invention and the peripheral portion thereof.

In FIG. 1, reference numeral 13 denotes a sampling interface axis; 17, a mass filter axis; 7*a*, 7*b*, 7*c*, respective electrodes of the ion lens 7; 19, an entrance aperture; 20*a*, 20*b*, 20*c*, 20*d*, quadrapole or quarternary deflection electrodes; and 21*a*, 21*b*, 21*c*, 21*d*, scanning electrodes.

In the electrodes 7*a*, 7*b*, 7*c*, holes are opened along the sampling interface axis 13 which penetrates at the centers thereof, and these electrodes 7*a*, 7*b*, 7*c* constitute a so-called "Einzel-lens". Voltages are applied from an electrode power supply 30 to the respective electrodes of the Einzel-lens 7. The Einzel-lens 7 may adjust the focal distance by controlling the potential at the electrode 7*b* while the electrodes 7*a* and 7*c* are fixed at the same potential. In other words, the beam of the incident ion along the sampling interface axis 13 can be converged by controlling the voltage of the electrode 7*b* in such a manner that the ion beam is focused on a point near the entrance of the mass filter 8.

The quadrapole deflection electrodes 20*a*, 20*b*, 20*c*, 20*d* are arranged in such a way that a cylinder is subdivided into quarters along the vertical direction, and the curved surface of each at the quarters is arranged in parallel to each other in a rectangular arrangement facing inwards. Each axis of the quadrapole deflection electrodes 20*a*, 20*b*, 20*c*, 20*d* has a right angle with the sampling interface axis 13 and the mass filter axis 17, respectively. The sampling interface axis 13 penetrates the center of the gap of, for example, the quadrapole deflection electrodes 20*a*, 20*b*. That is, the quadrapole deflection electrodes 20*a*, 20*b*, 20*c*, 20*d* constitute a deflector 20 for deflecting the ion axis by 90 degrees. An electrode power supply 30 applies voltages to the respective quadrapole deflection electrodes 20*a*, 20*b*, 20*c*, 20*d* under the following condition, assuming that voltages to be applied to the respective quadrapole deflection electrodes 20*a*, 20*b*, 20*c*, 20*d* for constituting the deflector 20 are V20*a*, V20*b*, V20*c*, V20*d*:

V20*a*=V20*c*,

V20*b*=V20*d*.

Thus, an electrostatic quadrapole field is formed inside the deflector 20.

It should be understood that although the curved surface of the insides of the quadrapole deflection electrodes have the shapes of rectangular hyperbola as ideal shapes, this ideal shape may be approximated by the cylindrical surface of the electrode according to this embodiment. The ion incident axis A in the generated electrostatic quadrapole field is made coincident with the sampling interface axis 13. The sampling interface 22, the ion lens 7 and the mass filter 8 are arranged such that the projection (radiation) axis B of the ion beam from the deflector 20 is made coincident with the mass filter axis 17 in the electrostatic quadrapole field along the direction at 90 degrees with respect to the incident axis A. Then, when the average voltage to be applied to the quadrapole deflection electrodes 20*a*, 20*b*, 20*c*, 20*d* is set to V20*a*v, a voltage of (1−K)V20*a*v is applied to the quadraple deflection electrodes 20*a* and 20*c*, whereas a voltage of (1+K)V20*av* is applied to the quadrapole deflection electrodes 20*b* and 20*d*. The voltage of V20*a*v is the average voltage within the deflector 20, and is fixed. Symbol "K" indicates a deflection coefficient. When this deflection coefficient "K" is controlled to be on the order of 0.8, the ion beam incident upon the electrostatic quadrapole field along the sampling interface axis 13 (axis "A") is deflected by 90 degrees and is then projected along the mass filter axis 17 (axis "B").

Neutral particles which could not be ionized in the plasma, and the light from the plasma reach the ion lens 7 in combination with the ions. When the light from the plasma enters into a detector 9 (not shown in FIG. 1), this plasma light may function as background noise, which would deteriorate the analyzing performance. However, with the above-described structure of the deflector, the light passes through the ion lens 7 and the deflector 20 along the straight line, and does not reach the mass filter 8 and the detector 9. When neutral particles collide with the ion lens 7, the respective electrodes employed within the deflector 20 and the mass filter 8, there is a possibility that insulating films may be formed on the respective electrodes and the like. When the insulating films are formed in this manner, the electrodes are charged, which may disturb the electric fields produced in the ion lens 7, the deflector 20 and the mass filter 8. Therefore, the path of the ions incident upon the mass filter may become unstable. However, since neutral particles penetrate through the deflector 20 due to the above-described structure of the deflector 20, such particles do not collide with the respective electrodes, and there is no possibility that a harmful insulating film is formed thereon.

The scanning electrode 21 has such a shape that either plate-shaped electrodes or cylindrical electrodes are located opposite to each other with a relationship between 21*a* and 21*b*, and 21*c* and 21*d*, split along the vertical direction. A voltage is applied from an electrode power supply 30 to the scanning electrodes 21. Assuming that the voltages to be applied to the respective scanning electrodes 21*a*, 21*b*, 21*c*, 21*d* of the scanning electrode 21 are V21*a*, V21*b*, V21*c*, V21*d*, these voltages V21*a*, V21*b*, V21*c* and V21*d* may be expressed based on V21*av*, Dx, Dy as follows:

V21*a*=V21*av*+Dy,

V21*b*=V21*av*−Dy,

V21*c*=V21*av*+Dx,

V21*d*=V21*av*−Dx.

Now, symbol V21*av* indicates an average voltage within the scanning electrode 21 and is fixed. The beam of the ions can be deflected by Dx along the direction from the scanning electrode 21*c* to the scanning electrode 21*d*. The beam of the ions can be deflected by Dy along the direction from the scanning electrode 21*a* to the scanning electrode 21*b*. Since Dx and Dy from the electrode power supply are adjusted to a so-called "scanning signal", the ion beam converged and deflected by the deflector 20 can be deflected and scanned. In this case, the scanning signal may be used a so-called "raster scan", or a vector scan, or a signal for scanning a predetermined arbitrary scanning point. In other words, the converged ion beam projected from the deflector 20 is scanned at an incident entrance 23 (see FIG. 4) corresponding to the ion acquisition entrance of the mass filter 8, and at an area near this incident entrance 23 by the scanning electrode 21.

Figure 6:
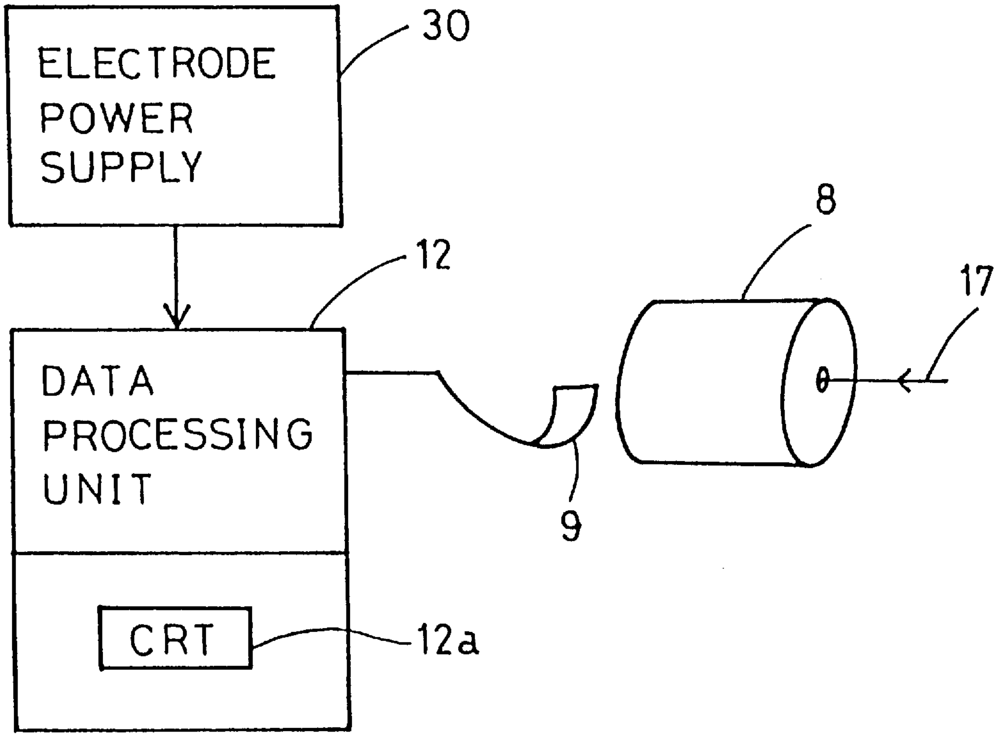
FIG. 6 shows the near part of the display of the invention.

As shown in FIG. 6, the ions separated by and passed through the mass filter 8 are detected by the detector 9. The signal from the detector 9 is supplied to the data processing unit 12 in the same manner described above in the section entitled "BACKGROUND OF THE INVENTION".

A description will now be made of an idea for optimizing the ion lens 7 and the quadruple deflector 20.

Figure 4:
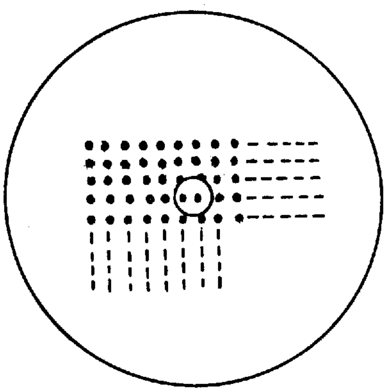
FIG. 4 represents a condition that an ion beam irradiates an entrance of a mass filter.

FIG. 4 schematically represents a condition in which the ion beam has passed through the ion lens 7 and is projected onto the entrance of the mass filter 8. Reference numeral 16 is an aperture, and is a plate positioned at the entrance (inlet) of the mass filter 8, in which an inlet hole 23 is opened while centering therein the mass filter axis 17. Reference numeral 24 indicates an illumination spot of the ion beam, and a point where the ion beam is intersected with the plane of the aperture 16. The position of the beam illumination spot 24 can be moved (scanned) by moving (scanning) the scanning signals Dx and Dy supplied to the respective scanning electrodes 21*a*, 21*b*, 21*c*, 21*d* from the electrode power supply.

In FIG. 4, the beam illumination spot 24 is moved by Dx along the transverse direction, and by Dy along the longitudinal direction. Then, when the beam illumination spot 24 is entered into the inlet hole 23, the ions are mass-separated by the mass filter 8 and then are detected by a detector 9, and are counted by a data processing unit 12. When Dx and Dy are synchronized with the counting (otherwise counting ratio) at the data processing unit 12, various information about the positions (plane position of aperture 16) of the ions and the shapes (Spreading degrees) thereof incident upon the mass filter 8 can be obtained in the case that the scanning signals inputted into the respective scanning electrodes are changed into signals not for deflecting the ion beams.

Figure 5:
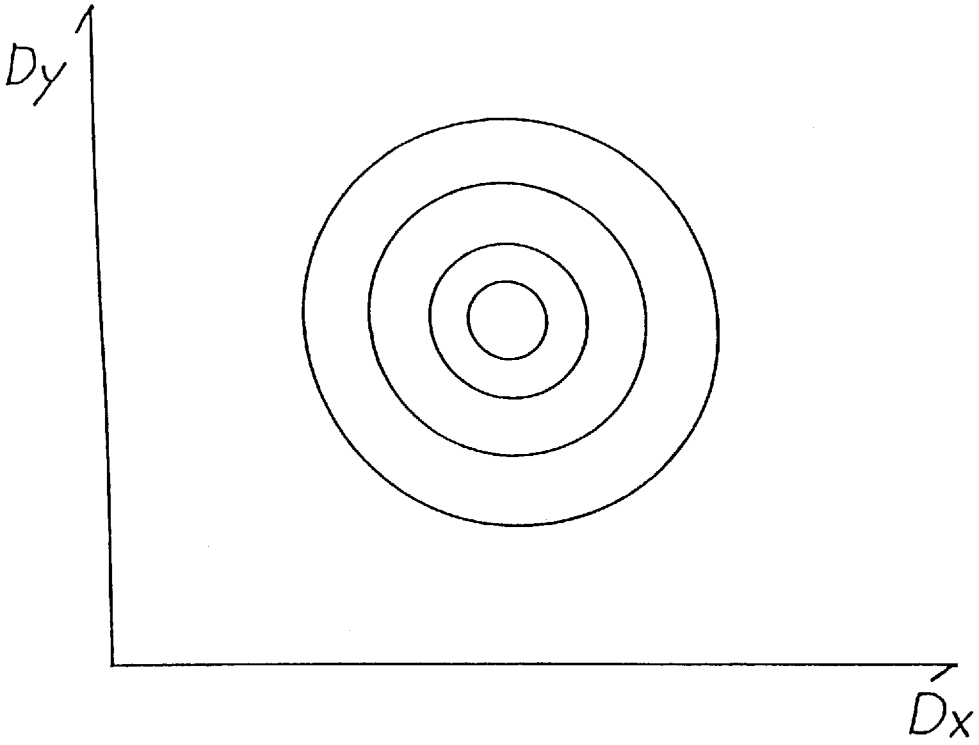
FIG. 5 is a diagram showing the ions counted in synchronism with Dx and Dy as a contour line graph of a counting rate.

FIG. 5 is a graphic representation for showing that the ions counted in synchronism with Dx and Dy are indicated as a contour line graph of a counting rate. As the ions to be counted, there are selected ions of elements contained in the reference sample, and molecular ions. Also, the synchronized signals which have been obtained in this way are displayed on an image display apparatus such as a CRT 12*a* as a contour line graph, or as brightness. This information is A/D-converted and is stored as a bit map by image storage means included in the data processing unit. In other words, the two-dimensional widening condition of the ion beam immediately before being fetched by the mass filter 8 can be obtained as a two-dimensional image.

From the contour lines of FIG. 5, not only the positions of the ion beams can be recognized, but also such convergence conditions as the beam diameters and the astigmatic points can be recognized. In other words, the beam diameter may be handled by a half width value thereof along the Dx and Dy directions, and the astigmatic condition may be handled as a half width value along the Dx direction and also as a half width value along the Dy direction. Then, when the voltage of the electrode 7*b* of the ion lens 7 is arbitrary varied and this voltage value is optimum, the beam diameter becomes minimum and the counting ratio of the peak becomes maximum. Also, the coefficient "K" related to the voltage to be applied to the deflector 20 may be arbitrarily varied. When the value of "K" becomes optimum, the astigmatic point becomes minimum and the counting rate of the peak becomes maximum.

Next, a description will now be made of a sequence for optimizing the voltages to be applied to the ion lens 7 and the deflector 20. First, "K" is optimized. "K" is set to 0.7 and Dy is set to −100V. Then, while Dx is increased from −100V by 5V, the counting operation is carried out. After Dx reaches 100V, Dy is increased by 5V. Then, Dx is set to −100V, and Dy is similarly increased up to 100V by 5V to carry out the counting operation. This operation is performed until Dy becomes 100V. That is to say, while the deflection of the ion beams by the deflector 20 is maintained constant, the ion beam projected from the deflector 20 is scanned by the scanning electrode 21. Then, assuming that a maximum value of the count values so far obtained is used as the count value of K=0.7, this count value is stored together with Dx and Dy. Next, "K" is increased by 0.01, and a similar counting operation is carried out, and Dx and Dy which cause the maximum count are stored together with the count value. The above-described counting operation is carried out until "K" becomes 0.90 to obtain the count values while "K" becomes 0.7 to 0.9. Among them, such a "K" when the count value becomes maximum corresponds to an optimum value for this "K". Namely, the astigmatic point becomes minimum.

"K" is set to the optimum value, and thereafter the voltage of the electrode 7*b* of the ion lens 7 is optimized. The voltage of the electrode 7*b* is set to −500V, and Dy is set to −100V. Then, while Dx is increased from −100V by 5V, the counting operation is carried out. After Dx has reached 100V, Dy is increased by 5V. Then, Dx is set to −100V, and Dy is similarly increased by 5V up to 100V, whereby the counting operation is performed. This counting operation is performed until Dy becomes 100V. Then, the maximum value among the count values so far obtained is used as the count value under condition that the voltage of the electrode 7*b* is −500V, and this maximum value is stored together with Dx and Dy at this time. Next, the above-explained counting operation is carried out until the voltage of the electrode 7*b* becomes 0V, and the count value is obtained when the voltage of the electrode 7*b* is from −500V to 0V. In this case, such a voltage when the count value becomes maximum becomes an optimum value of the voltage at the electrode 7*b*. Then, Dx and Dy at this time correspond to optimum values for Dx and Dy.

Although the voltages for the respective electrodes of the ion lens 7 are optimized by considering the peak counting value in the above-described example, the present invention is not limited thereto. Alternatively, it is possible to optimize the voltages in such a manner that either the half value width along the Dx direction is equal to the half value width along the Dy direction or both of the half value widths along the Dx and Dy directions become minimum.

Although Dx and Dy are surface-scanned in the above-explained example, even when the number of combined Dx and Dy is decreased based on the simplex method, it is possible to search the peak value from the count values.

The data processing unit 12 counts the signal from the detector 9 in synchronism with the scanning signal to be applied by the electrode power supply 30 to the scanning electrode 21 in order to scan the ion. Based on the voltage to be applied to the scanning electrode 21 and the signal from the detector 9, the data processing unit 12 calculates optimum values of voltages applied to the deflector 20 and the scanning electrode 21, and sends a signal for instructing a voltage value to be applied to the ion lens.

The voltages(signals) to be applied to the ion lens 7, the deflector 20 or the scanning electrode 21 are fixed under the optimal values. The identification or the determination of very small impurity within the sample is then begun.

In accordance with the present invention, ion lens voltages can be optimized without skilled experiences such that a sufficient sensitivity can be achieved under stable conditions. Also, a confirmation can be made that the respective voltages for the ion lens and the deflector are optimized. As a result, it is possible to conduct an analysis with high reliability.

What is claimed is:

1. A plasma ion source mass spectrometer comprising: a plasma ion source for ionizing a sample in a plasma; a vacuum vessel; a sampling interface for introducing the ionized sample into the vacuum vessel; an ion lens disposed in the vacuum vessel for focusing the ionized sample and producing an ion beam; a mass filter disposed in the vacuum vessel for separating ions in the ion beam by mass; a deflector disposed in the vacuum vessel for deflecting the ion beam by a predetermined angle for preventing an interruptive ray from the plasma ion source from entering the mass filter; a scanning electrode disposed in the vacuum vessel for scanning the ion beam; a detector disposed in the vacuum vessel for detecting when an ion has passed through the mass filter and producing an output signal in response thereto; an electrode power supply for applying a scanning signal to the scanning electrode, and applying predetermined voltage signals to the ion lens and the deflector; and a data processing unit for counting output signals from the detector in synchronism with the scanning signal applied by the electrode power supply to the scanning electrode so as to enable the setting of optimum voltage signals to be applied to the ion lens and the deflector and an optimum scanning signal to be applied to the scanning electrode.

2. A plasma ion source mass spectrometer according to claim 1; wherein the data processing unit includes means for calculating optimum voltage signals to be applied to the deflector, the scanning electrode and the ion lens.

3. A plasma ion source mass spectrometer according to claim 1; wherein the deflector deflects the ion beam by 90 degrees by applying an electrostatic quadrapole field to the ion beam.

4. A plasma ion source mass spectrometer according to claim 1; wherein the deflector has an opening on a side opposite the sampling interface.

5. A plasma ion source mass spectrometer according to claim 4; wherein the opening in the deflector is formed on the axis of the sampling interface.

6. A plasma ion source mass spectrometer according to claim 1; wherein the deflector has quadrapole electrodes for forming a quadrapole field, and an ion beam produced by the ion lens is incident from an axis of the quadrapole field, is emergent from an axis that is at an angle of 90° with respect to the axis of the quadrapole field, and is introduced into the mass filter.

7. A plasma ion source mass spectrometer according to claim 1; further comprising a second vacuum vessel for containing the plasma, the sample and the sampling interface.

8. A plasma ion source mass spectrometer according to claim 1; wherein the sampling interface comprises a sampling cone and a skimmer cone.

9. A plasma ion source mass spectrometer according to claim 8; wherein the sampling cone has a conical shape and has an opening in an end thereof having a diameter of from 0.8 to 1.2 mm.

10. A plasma ion source mass spectrometer according to claim 8; wherein the skimmer cone has a conical shape and has an opening in an end thereof having a diameter of from 0.3 to 0.6 mm.

11. A plasma ion source mass spectrometer comprising: a plasma ion source for ionizing a sample in a plasma; a vacuum vessel; a sampling interface for introducing the ionized sample into the vacuum vessel; an ion lens disposed in the vacuum vessel for focusing the ionized sample and producing an ion beam; a mass filter disposed in the vacuum vessel for separating the ions in the ion beam by mass; a deflector disposed in the vacuum vessel for deflecting the ion beam by a predetermined angle for preventing an interruptive ray from the plasma ion source from entering the mass filter; a scanning electrode disposed in the vacuum vessel for scanning the ion beam; a detector disposed in the vacuum vessel for detecting when an ion has passed through the mass filter and producing an output signal in response thereto; an electrode power supply for applying a scanning signal to the scanning electrode, and applying predetermined voltage signals to the ion lens and the deflector; a display for displaying signals based on the intensity of the output signals of the detector in synchronism with the scanning signal applied by the electrode power supply to the scanning electrode in order to scan the ion beam so as to enable the setting of optimum voltage signals to be applied to the ion lens and the deflector and an optimum scanning signal to be applied to the scanning electrode.

12. A plasma ion source mass spectrometer according to claim 11; wherein the deflector deflects the ion beam by 90 degrees by applying an electrostatic quadrapole field to the ion beam.

13. A plasma ion source mass spectrometer according to claim 11; wherein the electrode power supply applies fixed signals to the scanning electrode so as to stop the scanning of the ion beam at a desired position.

14. A plasma ion source mass spectrometer according to claim 11; wherein the deflector has a opening on a side opposite the sampling interface.

15. A plasma ion source mass spectrometer according to claim 14; wherein the opening in the deflector is formed on the axis of the sampling interface.

16. A plasma ion source mass spectrometer according to claim 11; wherein the deflector has quadrapole electrodes for forming a quadrapole field, and an ion beam produced by the ion lens is incident from an axis of the quadrapole field, is emergent from an axis that is at an angle of 90° with respect to the axis of the quadrapole field, and is introduced into the mass filter.

17. A plasma ion source mass spectrometer according to claim 11; further comprising a second vacuum vessel for containing the plasma and the sample.

18. A plasma ion source mass spectrometer according to claim 11; wherein the sampling interface comprises a sampling cone and a skimmer cone.

19. A plasma ion source mass spectrometer according to claim 18; wherein the sampling cone has a conical shape and has an opening in an end thereof having a diameter of from 0.8 to 1.2 mm.

20. A plasma ion source mass spectrometer according to claim 18; wherein the skimmer cone has a conical shape and has an opening in an end thereof having a diameter of from 0.3 to 0.6 mm.

21. A plasma ion source mass spectrometer comprising: a plasma ion source for ionizing a sample in a plasma; a vacuum vessel; a sampling interface for introducing the produced ions into the vacuum vessel; an ion lens disposed in the vacuum vessel for focusing the ions; a mass filter disposed in the vacuum vessel for separating ions by mass, wherein a 90° angle exists between an axis of the sampling interface and an axis of the mass filter; a deflector for deflecting an ion beam that has passed through the ion lens by 90°, the deflector having an opening on a side opposite the sampling interface, and having quadrapole electrodes for forming a quadrapole field, such that an ion beam that has passed through the sampling interface is incident from an axis of the quadrapole field, is emergent from an axis that is at an angle of 90° with respect to the axis of the quadrapole field, and is introduced into the mass filter; a detector disposed in the vacuum vessel for detecting when an ion of a predetermined mass has passed through the mass filter and producing a corresponding output signal in response thereto; a scanning electrode disposed between the deflector and the mass filter for scanning the ion beam with respect to the mass filter; and a data processing unit for counting the output signals of the detector and for controlling voltages applied to the scanning electrode, the ion lens and the deflector so as to maximize the count value.

22. A plasma ion source mass spectrometer comprising: a plasma ion source for ionizing a sample in a plasma; a vacuum vessel; a sampling interface for introducing the produced ions into the vacuum vessel; an ion lens disposed in the vacuum vessel for focusing the ions; a mass filter disposed in the vacuum vessel for separating ions by mass; a deflector for deflecting an ion beam that has passed through the sampling interface by a predetermined angle, the deflector having an opening on a side opposite the sampling interface to allow an interfering ray from the plasma to pass therethrough; a scanning electrode disposed in the vacuum vessel between the deflector and the mass filter for scanning the ion beam with respect to the mass filter; a detector disposed in the vacuum vessel for detecting the separated ions and producing an output signal corresponding to the number of detected separated ions; a power supply for supplying a voltage to the ion lens, the deflector, and the scanning electrode; and a data processing unit receptive of the output signal of the detector for counting a number of detected ions, and for controlling the power supply to supply voltages to the ion lens, the deflector and the scanning electrode so as to deflect the ion beam to maximize the detected count value.

23. A plasma ion source mass spectrometer according to claim 22; wherein the opening in the deflector is formed on the axis of the sampling interface.

24. A plasma ion source mass spectrometer according to claim 22; wherein the deflector has quadrapole electrodes for forming quadrapole field, and an ion beam produced by the ion lens is incident from an axis of the quadrapole field, is emergent from an axis that is at an angle of 90° with respect to the axis of the quadrapole field, and is introduced into the mass filter.

25. A plasma ion source mass spectrometer according to claim 22; further comprising a second vacuum container for containing the plasma, the sample and the sampling interface.

26. A plasma ion source mass spectrometer according to claim 22; wherein the sampling interface comprises a sampling cone and a skimmer cone.

27. A plasma ion source mass spectrometer according to claim 22; wherein the sampling cone has a conical shape and has an opening in an end thereof having a diameter of from 0.8 to 1.2 mm.

28. A plasma ion source mass spectrometer according to claim 22; wherein the skimmer cone has a conical shape and has an opening in an end thereof having a diameter of from 0.3 to 0.6 mm.

29. A plasma ion source mass spectrometer according to claim 22; wherein the deflector comprises a cylindrical electrode divided into quarters along a vertical axis thereof, and in which the curved surface of each of the quarters is arranged parallel to each other in a rectangular arrangement facing inwards.

30. A plasma ion source mass spectrometer according to claim 29; wherein the curved surface of each of the quarters has a rectangular hyperbola shape.

31. A plasma ion source mass spectrometer according to claim 29; wherein the average voltage applied to the deflector is Vav, the voltage applied to a pair of diagonally opposed quarters is represented by $(1-K)Vav$, and the voltage applied to the other pair of diagonally opposed quarters is represented by $(1+K)Vav$, wherein K is defined as a deflection coefficient.

32. A plasma ion source mass spectrometer according to claim 31; wherein K is set between 0.7 and 0.9.

33. A plasma ion source mass spectrometer according to claim 31; wherein the data processing unit includes means for determining an optimum value of K by performing a measurement operation including varying a scanning signal applied to the scanning electrode over a range of voltage levels for each of a plurality of selected values of K, counting the number of ions at each setting, and selecting the value of K at which the count is maximum.

34. A plasma ion source mass spectrometer according to claim 33; wherein the data processing unit includes means for determining an optimum voltage to be applied to the ion lens by performing a measurement operation including varying a scanning signal applied to the scanning electrode over a range of voltage levels for each of a plurality of selected voltages applied to the ion lens, counting the number of ions at each setting, and selecting the voltage value at which the count is maximum.

35. A plasma ion source mass spectrometer according to claim 22; wherein the scanning electrode comprises a plurality of electrodes arranged in opposing pairs, each pair effective to generate a force for deflecting the ion beam in accordance with an applied scanning signal.

* * * * *